US009499658B2

(12) United States Patent
Yoo et al.

(10) Patent No.: US 9,499,658 B2
(45) Date of Patent: *Nov. 22, 2016

(54) POLYLACTIC ACID RESIN, PREPARATION METHOD THEREOF, AND PACKING FILM COMPRISING THE SAME

(76) Inventors: Young-Man Yoo, Seoul (KR); Tae-Woong Lee, Gyeonggi-do (KR); Kye-Yune Lee, Gyeonggi-do (KR); Jae-Il Chung, Gyeonggi-do (KR)

( * ) Notice: Subject to any disclaimer, the term of this patent is extended or adjusted under 35 U.S.C. 154(b) by 0 days.

This patent is subject to a terminal disclaimer.

(21) Appl. No.: 13/883,881

(22) PCT Filed: Nov. 2, 2011

(86) PCT No.: PCT/KR2011/008307
§ 371 (c)(1),
(2), (4) Date: Jun. 17, 2013

(87) PCT Pub. No.: WO2012/064043
PCT Pub. Date: May 18, 2012

(65) Prior Publication Data
US 2014/0004330 A1  Jan. 2, 2014

(30) Foreign Application Priority Data

| Nov. 8, 2010 | (KR) | 10-2010-0110547 |
| Nov. 10, 2010 | (KR) | 10-2010-0111766 |
| Nov. 10, 2010 | (KR) | 10-2010-0111767 |
| Dec. 17, 2010 | (KR) | 10-2010-0130215 |
| Dec. 17, 2010 | (KR) | 10-2010-0130216 |
| Dec. 17, 2010 | (KR) | 10-2010-0130217 |
| Dec. 17, 2010 | (KR) | 10-2010-0130218 |
| Dec. 17, 2010 | (KR) | 10-2010-0130226 |

(51) Int. Cl.
*C08G 18/83* (2006.01)
*C08G 18/42* (2006.01)
*C08G 18/48* (2006.01)

(52) U.S. Cl.
CPC .......... *C08G 18/831* (2013.01); *C08G 18/428* (2013.01); *C08G 18/48* (2013.01)

(58) Field of Classification Search
CPC .... C08G 63/16; C08G 63/823; C08G 18/42; C08G 63/08; Y10T 428/31786
USPC ........... 525/28, 452–460; 528/418, 354, 69; 428/220; 623/1.42
See application file for complete search history.

(56) References Cited

U.S. PATENT DOCUMENTS

| 2008/0140185 A1* | 6/2008 | Kiser et al. ............... 623/1.42 |
| 2009/0203852 A1* | 8/2009 | Urakami ............... C08L 67/04 |
| | | 525/418 |
| 2010/0093888 A1 | 4/2010 | Endo et al. |
| 2010/0323575 A1 | 12/2010 | He et al. |
| 2011/0263762 A1 | 10/2011 | Matsuno et al. |

FOREIGN PATENT DOCUMENTS

| CN | 1621433 | 6/2005 |
| CN | 101130600 | 2/2008 |
| JP | H08-85722 | 4/1996 |
| JP | H08-295727 | 11/1996 |
| JP | H10-101778 | 4/1998 |
| JP | 2002-088145 | 3/2002 |
| JP | 2004-250697 | 9/2004 |
| JP | 2005-008897 A | 1/2005 |
| KR | 10-2008-0079421 | 9/2008 |
| KR | 10-2009-0118938 A | 11/2009 |
| KR | 10-2010-0098529 | 11/2010 |
| WO | WO 2007-005253 | 1/2007 |
| WO | WO 2010-053065 A1 | 5/2010 |
| WO | WO 2010-053167 A1 | 5/2010 |

OTHER PUBLICATIONS

Zeng et al. "A novel biodegradable multiblock poly(ester urethane) containing poly(L-lactic acid) and polybutylene succinate) blocks" Polymer, 50, 2009, 1178-1186.*
Zhang et al. "Synthesis and Properties of High Moleuclar Weight Poly(Lactic Acid) and Its Resultant Fibers" Chinese Journal of Poly. Sci., 26, 2008, 425-432.*
Zeng et al. ("A novel biodegradable multiblock poly(ester urethane) containing poly(L-lactic acid) and poly(butylene succinate) blocks" Polymer, 2009, 50, p. 1178-1186).*
Zeng et al. ("A novel biodegradable multiblock poly(ester urethane) containing poly(L-lactic acid) and poly(butylene succinate) blocks" Polymer, 2009, 50, p. 1178).*
International Search Report prepared by the Korean Intellectual Property Office on Jun. 5, 2012, for International Application No. PCT/KR2011/008307.

* cited by examiner

*Primary Examiner* — Maria Veronica Ewald
*Assistant Examiner* — Travis Figg

(57) ABSTRACT

The present invention relates to a polylactic acid resin and a packaging film comprising the same, wherein the polylactic acid resin is useful as a packaging material due to excellent properties including heat resistance as well as optimized flexibility. The polylactic acid resin comprises: a hard segment including a predetermined polylactic acid repeating unit; and a soft segment including a polyurethane polyol repeating unit in which certain polyether-based polyol repeating units are linearly connected in a medium of a urethane bond. In addition, the polylactic acid resin has a glass transition temperature (Tg) of 25-55° C.

16 Claims, No Drawings

POLYLACTIC ACID RESIN, PREPARATION METHOD THEREOF, AND PACKING FILM COMPRISING THE SAME

CROSS REFERENCE TO RELATED APPLICATIONS

This application is a national stage application under 35 U.S.C. 371 and claims the benefit of PCT Application No. PCT/KR2011/008307 having an international filing date of Nov. 2, 2011, which designated the United States, and which PCT application claimed the benefit of Korean Patent Application No. 10-2010-0110547 filed Nov. 8, 2010; Korean Patent Application No. 10-2010-0111766 filed Nov. 10, 2010; Korean Patent Application No. 10-2010-0111767 filed Nov. 10, 2010; Korean Patent Application No. 10-2010-0130215 filed Dec. 17, 2010; Korean Patent Application No. 10-2010-0130216 filed Dec. 17, 2010; Korean Patent Application No. 10-2010-0130217 filed Dec. 17, 2010; Korean Patent Application No. 10-2010-0130218 filed Dec. 17, 2010; and Korean Patent Application No. 10-2010-0130226 filed on Dec. 17, 2010; the disclosures of which are incorporated herein by reference.

TECHNICAL FIELD

The present invention relates to a novel polylactic acid resin, a method for preparing the polylactic acid resin, and a packaging film comprising the same. More particularly, the present invention relates to a polylactic acid resin which is useful as a packaging material due to its excellent general properties including heat resistance and optimized flexibility, a method for preparing the polylactic acid resin, and a packaging film comprising the same.

This application claims the benefit of Korean Patent Application No. 10-2010-0110547, filed on Nov. 8, 2010, Korean Patent Application Nos. 10-2010-0111766 and 10-2010-0111767, filed on Nov. 10, 2010, and Korean Patent Application Nos. 10-2010-0130215, 10-2010-0130216, 10-2010-0130217, 10-2010-0130218, and 10-2010-0130226, filed on Dec. 17, 2010, the disclosures of all of which are hereby incorporated by reference in its entirety into this application.

BACKGROUND OF THE ART

Most conventional polymers derived from petroleum resources such as polyethylene terephthalate (PET), nylon, polyolefin and polyvinyl chloride (PVC) resins, have been used for materials for a wide range of applications such as packaging materials. However, these polymers are resistant to biodegradation and related to environmental issues like carbon dioxide gas, which causes the global warming on the waste treatment processes. In addition, there have been wide studies on the use of biomass-based resins including polylactic acid following the depletion of petroleum resources.

However, as polylactic acid derived from plants is lower in heat resistance and mechanical properties than petroleum-based resins, there have been limitations of the plastic applications. Particularly, attempts have been made to use polylactic acid resins as packaging materials such as packaging films, but they have failed due to the poor flexibility of polylactic acid resins.

In order to overcome the problems of polylactic acid resins, it has been suggested that low-molecular weight flexibilizers or plasticizers be added to polylactic acid resins, or plasticizers produced by addition polymerization of polyether-based or aliphatic polyester-based polyol be applied to the polylactic acid resins.

However, there is little improvement of flexibility in most of the packaging films comprising polylactic acid resins which are produced according to these methods. Furthermore, the packaging films exhibit poor stability as the plasticizers bleed out over time, and have the disadvantages of an increase in haze together with a decrease in low transparency. In most cases of conventional methods, an improvement in flexibility results from a great decrease in mechanical properties, workability, dimensional stability, and anti-blocking properties, and thus it is unsuitable for use in packaging films. Therefore, a polylactic acid resin that allows the production of packaging films with optimized flexibility is required.

Further, another problem of polylactic acid resins resides in poor heat resistance. When exposed to a high temperature, polylactic acid resins or films made thereof may undergo degradation by depolymerization.

Accordingly, there is a continuous demand for a polylactic acid resin film that has improved flexibility and exhibits excellent properties including mechanical properties, transparency, heat resistance, anti-blocking property, workability, and anti-bleed-out properties.

DETAILED DESCRIPTION OF THE INVENTION

Technical Objectives

It is therefore an object to provide a polylactic acid resin useful as a packaging material which exhibits optimized flexibility as well as general properties including heat resistance, workability, and mechanical properties.

It is another object of the present invention to provide a method for preparing the polylactic acid resin.

It is a further object of the present invention to provide a packaging film comprising the polylactic acid resin.

Technical Solutions

The present invention provides a polylactic acid resin, comprising a hard segment comprising a polylactic acid repeating unit of the following Chemical Formula 1; and a soft segment comprising a polyurethane polyol repeating unit in which polyether polyol repeating units of the following Chemical Formula 2 are linearly linked via a urethane bond, wherein the polylactic acid resin has a glass transition temperature (Tg) of 22 to 55° C.:

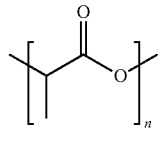

[Chemical Formula 1]

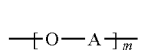

[Chemical Formula 2]

wherein A is a linear or branched alkylene of 2 to 5 carbon atoms, m is an integer of 10 to 100, and n is an integer of 700 to 5000.

The present invention also provides a method for preparing a polylactic acid resin comprising ring-opening polymerizing a monomer comprising at least one alkylene oxide to form a polymer having a polyether polyol repeating unit of the Chemical Formula 2; reacting the polymer having the polyether polyol repeating unit with a diisocyanate compound in the presence of a urethane reaction catalyst to form a polymer having a polyurethane polyol repeating unit in which the repeating units of Chemical Formula 2 are linearly linked via a urethane bond; and polycondensing a lactic acid or ring-opening polymerizing a lactide in presence of the polymer having the polyurethane polyol repeating unit to form a polylactic acid repeating unit of the Chemical Formula 1.

The present invention also provides a packaging film comprising the polylactic acid resin.

Hereinafter, a polylactic acid resin, a method for preparing a polylactic acid resin, and a packaging film comprising the same according to specific embodiments will be explained in detail.

According to one embodiment of the invention, there is provided a polylactic acid resin, comprising a hard segment comprising a polylactic acid repeating unit of the following Chemical Formula 1; and a soft segment comprising a polyurethane polyol repeating unit in which polyether polyol repeating units of the following Chemical Formula 2 are linearly linked via a urethane bond, wherein the polylactic acid resin has a glass transition temperature (Tg) of 22 to 55° C.:

[Chemical Formula 1]

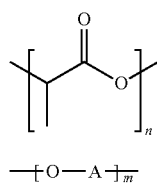

[Chemical Formula 2]

$-\!\!+\!\!O\!-\!\!A\!\!+\!\!_m$ wherein A is a linear or branched alkylene of 2 to 5 carbon atoms, m is an integer of 10 to 100, and n is an integer of 700 to 5000.

The polylactic acid resin basically comprises a polylactic acid repeating units represented by Chemical Formula 1 as a hard segment. And, the polylactic acid comprises a polyurethane polyol repeating unit as a soft segment in which polyether polyol repeating units of Chemical Formula 2 are linearly linked via a urethane bond (—C(=O)—NH—).

The polylactic acid resin has biodegradability which is characteristic of biomass-based resins, as comprising the polylactic acid repeating units as a hard segment. In addition, according to experiment data obtained by the present inventors, it is suggested that the polylactic acid resin appeared improved flexibility (e.g., a relatively low sum of Young's modulus measured in machine direction and transverse direction), and allowed the production of a film with high transparency and low haze by comprising the polyurethane polyol repeating units as a soft segment.

In addition, the polylactic acid resin has a glass transition temperature (Tg) of about 25 to 55° C., and preferably of about 30 to 55° C. The polylactic acid resin may comprise a block copolymer prepared by copolymerizing a polylactic acid repeating unit with a polyurethane polyol repeating unit in which polyether polyol repeating units are linearly linked via a urethane bond as a result of reaction with a diisocyanate compound. The polylactic acid resin was found to increase mechanical properties as well as flexibility of the film, and to endow the film with an optimized glass transition temperature (Tg) of about 25 to 55° C. by comprising the block copolymer.

Given the glass transition temperature range, the polylactic acid resin can be formed into a film with optimized flexibility and stiffness which can be preferably used as a packaging film. If the glass transition temperature of polylactic acid resin is too low, the film may be improved in flexibility but exhibits excessively low stiffness, and thus it is unsuitable for use as a packaging film owing to lack of slipping property, workability, dimensional stability, heat resistance or anti-blocking property. On the other hand, the film which has an excessively high glass transition temperature provides low flexibility and excessively high stiffness, so that it can be easily folded and the wrinkles therefrom do not disappear readily. Moreover, it may exhibit the poor adhesion strength of adhesive interface to a target to be wrapped. In addition, the film of the polylactic acid resin with too high a glass transition temperature causes the loud noise when flexible sheets or films are desired, such as for use in making wraps, bags and other packaging materials requiring good bend and folding capability In contrast, the polylactic acid resin according to an embodiment of the present invention has the optimized glass transition temperature and has the aforementioned structural features and thus presently provides specifications or conditions suitable for the optimized film with flexibility. In addition, the film also exhibits excellence in other general physical properties, including mechanical properties, heat resistance, anti-blocking property, and transparency, and thus it can be preferably used for various packaging purposes.

The polylactic acid repeating unit of Chemical Formula 1 used as a constitutional element of the hard segment of the polylactic acid resin according to an embodiment of the present invention may be a polylactic acid homopolymer or a repeating unit of the homopolymer. This polylactic acid repeating unit may be obtained through a typical method for preparing a polylactic acid homopolymer. For example, L- or D-lactic acid may form an L- or D-lactide, a cyclic diester of lactic acid, which is then ring-opening polymerized into the polylactic acid repeating unit, Or L- or D-lactic acid may be directly polymerized into the repeating unit through polycondensation. The ring-opening polymerization method is desirable because it guarantees the polylactic acid repeating unit with a higher degree of polymerization. In addition, the polylactic acid repeating unit may be prepared by copolymerizing L-lactide and D-lactide at such a certain ratio so as to make the copolymer non-crystalline, but the polylactic acid repeating unit is preferably prepared by homopolymerization of either L-lactide or D-lactide in order to increase the heat resistance of the film comprising the polylactic acid resin. More specifically, an L- or D-lactide material with optical purity of about 98% or higher may be subjected to ring-opening polymerization to give the polylactic acid repeating unit. Lower optical purity might decrease the melting temperature (Tm) of the polylactic acid resin.

Also, the polyurethane polyol repeating unit of the soft segment has a structure in which the polyether polyol repeating units of Chemical Formula 2 are linearly linked via a urethane bond (—C(=O)—NH—). More specifically, the polyether polyol repeating unit refers to a polymer prepared from a monomer such as alkylene oxide by ring-opening (co)polymerization, or a repeating unit of the polymer, and may have a hydroxyl group at its end. This terminal hydroxyl group may be reacted with a diisocyanate compound to form a urethane bond (—C(=O)—NH—) through which the polyether polyol repeating units are linearly linked to each other to afford the polyurethane polyol repeating unit. Serving as a soft segment, the polyurethane polyol repeating unit can make a great contribution to an improvement in the flexibility of the film comprising the polylactic acid resin. In addition, the polyurethane polyol repeating unit can allow the polylactic acid resin or a film comprising the polylactic acid resin to exhibit excellent physical properties without deteriorating heat resistance, anti-blocking property, mechanical properties, or transparency.

In contrast, polylactic acid copolymers comprising a soft segment in which polyester polyol repeating units are linked via a urethane bond are already known. However, the polylactic acid copolymers have some problems that low transparency and high haze of the film due to low compatibility between polyester polyol and polylactic acid. Furthermore, the polylactic acid copolymers have a wide range of molecular weight distribution and low glass transition temperature, so that they cannot be smoothly extruded into films due to a poor melting property. The films are also poor in mechanical properties, heat resistance, and anti-blocking property.

In addition, polylactic acid copolymers in which tri- or higher functional isocyanate compounds are used to copolymerize polyether polyol repeating units with polylactic acid repeating units in a branch pattern, or polylactic acid copolymers in which a copolymer of polyether polyol repeating units and polylactic acid repeating units is extended by a urethane reaction are also already known. But, these polylactic acid copolymers contain a small block size of the polylactic acid repeating units corresponding to the hard segment, and have too low glass transition temperature to exhibit sufficient heat resistance, mechanical properties, and anti-blocking property, and have a wide range of molecular weight distribution, so that they cannot be smoothly extruded into films due to a poor melting property.

By contrast, the polylactic acid resin of one embodiment of the present invention comprising a polylactic acid repeating unit and a polyurethane polyol repeating unit in which multiple polyether polyol repeating units are linearly linked via a urethane bond can be produced into films which exhibit excellent flexibility due to the polyurethane polyol repeating unit. In addition, the polylactic acid resin has an optimized glass transition temperature and a narrow range of molecular weight distribution, and comprises a large segment size of polylactic acid repeating units, so that the films produced therefrom can exhibit excellent mechanical properties, heat resistance, and anti-blocking property. Accordingly, the polylactic acid resin of one embodiment of the present invention is found to overcome the problems that the previous copolymers retain, and can be produced into films which exhibit excellent physical properties and greatly improved flexibility.

The polyether polyol repeating unit and the diisocyanate compound may be reacted with each other at a molar ratio of about 1:0.50 to 1:0.99 for the terminal hydroxyl group of the polyether polyol repeating unit:the isocyanate group of diisocyanate compound to form the polyurethane polyol repeating unit. The reaction molar ratio of the terminal hydroxyl of the polyether polyol repeating unit:the isocyanate group of diisocyanate compound may preferably range from about 1:0.60 to 1:0.90, and more preferably from about 1:0.70 to 1:0.85.

As will be explained below, the polyurethane polyol repeating unit refers to a polymer in which the polyether polyol repeating units are linearly linked via a urethane bond, or a repeating unit of the polymer, and may have a hydroxyl group at its terminal. Accordingly, the polyurethane polyol repeating unit may act as an initiator for the formation of the polylactic acid repeating unit in the polymerization process. When the molar ratio of the terminal hydroxyl group:isocyanate group exceeds about 0.99, the number of terminal hydroxyl groups of the polyurethane polyol repeating unit is so insufficient (OHV<3) that the polyurethane polyol repeating unit cannot suitably act as an initiator. On the other hand, when the molar ratio of the hydroxyl group:the isocyanate group is too low, the terminal hydroxyl group of the polyurethane polyol repeating unit becomes too abundant (OHV>21) to obtain polylactic acid repeating units and polylactic acid resins with high-molecular weight.

Meanwhile, the polyether polyol repeating unit may be a polyether polyol (co)polymer prepared from the one or more alkylene oxide monomers by ring-opening (co)polymerization, or repeating units thereof. Examples of the alkylene oxide monomers include ethylene oxide, propylene oxide, butylene oxide and tetrahydrofuran. The polyether polyol repeating unit prepared from the monomers may be exemplified by a repeating unit of polyethylene glycol (PEG); a repeating unit of poly(1,2-propylene glycol); a repeating unit of poly(1,3-propanediol); a repeating unit of polytetramethylene glycol; a repeating unit of polybutylene glycol; a repeating unit of a polyol copolymerized from propylene oxide and tetrahydrofuran; a repeating unit of a polyol copolymerized from ethylene oxide and tetrahydrofuran; and a repeating unit of a polyol copolymerized from ethylene oxide and propylene oxide. Considering the ability to endow the polylactic acid resin film with flexibility, affinity to the polylactic acid repeating unit, and water content property, a repeating unit of poly(1,3-propanediol) or polytetramethylene glycol may be preferably used as the polyether polyol. In addition, the polyether polyol repeating unit may have number average molecular weight about 400 to 9000, and preferably 1000 to 3000.

The diisocyanate compound may be any compound which has two isocyanate groups, so long as it can form a urethane bond with the terminal hydroxyl group of the polyether polyol repeating unit. Examples of the diisocyanate compounds include 1,6-hexamethylene diisocyanate, 2,4-toluene diisocyanate, 2,6-toluene diisocyanate, 1,3-xylene diisocyanate, 1,4-xylene diisocyanate, 1,5-naphthalene diisocyanate, m-phenylene diisocyanate, p-phenylene diisocyanate, 3,3'-dimethyl-4,4'-diphenylmethane diisocyanate, 4,4'-bisphenylene diisocyanate, hexamethylene diisocyanate, isophorone diisocyanate, and hydrogenated diphenylmethane diisocyanate. In addition, various other diisocyanate compounds well known to those who skilled in the art may be used without particular limitations. Considering the ability to endow the polylactic acid resin with flexibility, 1,6-hexamethylene diisocyanate is preferred.

Meanwhile, polylactic acid resin of one of the embodiment of the present invention may comprise a block copolymer that copolymerized with the hard segment and the soft segment mentioned above. More specifically, the block copolymer may have such a structure that the polylactic acid repeating unit of the hard segment is bonded to the polyurethane polyol repeating unit of the soft segment, or that the terminal carboxyl group of the polylactic acid repeating unit is linked to the terminal hydroxyl group of the polyurethane polyol repeating unit via an ester bond. For example, the chemical structure of the block copolymer may be represented by the following General Formula 1:

polylactic acid repeating unit (L)-Ester-polyurethane
       polyol repeating unit (E-U-E-U-E)-Ester-poly-
       lactic acid repeating unit (L)       [General Formula 1]

wherein E is a polyether polyol repeating unit, U is a urethane bond, and Ester is an ester bond.

As comprising a block copolymer that copolymerized with the polylactic acid repeating unit and the polyurethane polyol repeating unit, the polylactic acid resin can prevent the bleed-out of the polyurethane polyol repeating unit responsible for flexibility while guaranteeing high transparency, mechanical properties, heat resistance or anti-blocking property for the film produced therefrom. Particularly, the polylactic acid resin in the form of a copolymer of the polylactic acid repeating unit and the polyurethane polyol repeating unit is optimized in glass transition temperature (Tg) and melting temperature (Tm), thus improving the film in flexibility, anti-blocking property, and heat resistance.

Not all of the polylactic acid repeating units of the polylactic acid resin needs to be in the form of a block copolymer with the polyurethane polyol repeating unit, and at least a part of the polylactic acid repeating units may not be bonded to the polyurethane polyol repeating unit, but may take a form of a polylactic acid homopolymer. In this case, the polylactic acid resin takes a mixed form in which the block copolymer exists together with a polymer of the polylactic acid repeating unit remaining uncoupled with the polyurethane repeating unit, that is, a polylactic acid homopolymer.

On the basis of the total weight (the weight of the block copolymer, and optionally plus the weight of the polylactic acid homopolymer when it exists) thereof, the polylactic acid resin may contain the hard segment in an amount of from about 80 to 95 wt % and the soft segment in an amount of from about 5 to 20 wt %, preferably the hard segment in an amount of from about 82 to 92 wt % and the soft segment in an amount of from about 8 to 18 wt %, and more preferably the hard segment in an amount of from about 85 to 90 wt % and the soft segment in an amount of from about 10 to 15 wt %.

If the content of the soft segment is too high, it is difficult to provide a high-molecular weight polylactic acid resin, which may result in deteriorating mechanical properties such as film strength. In addition, the high content of the soft segment reduces the glass transition temperature, exerting a negative effect on the slipping, workability or dimensional stability, and anti-blocking property of the film to be used in packaging. On the other hand, the small content of the soft segment imparts a limitation to the flexibility of the polylactic acid resin and the film thereof. Particularly, the glass transition temperature of the polylactic acid resin is increased excessively if the soft segment is contained at a small ratio, so that the film may be degraded in flexibility, and it is difficult for the polyurethane polyol repeating unit of the soft segment to properly function as an initiator, which results in a decreasing polymerization conversion rate or impeding the formation of high-molecular weight polylactic acid resin.

The polylactic acid resin may further comprise a phosphorous stabilizer and/or an antioxidant so as to prevent the soft segment from undergoing oxidization or thermal degradation. The examples of the antioxidant are hindered phenol antioxidants, amine antioxidants, thio antioxidants, or phosphate antioxidants. Suitable stabilizers and antioxidants are well known to those who skilled in the art.

In addition to a stabilizer and an antioxidant, the polylactic acid resin may contain various additives, such as a plasticizer, a UV stabilizer, a color blocking agent, an anti-gloss agent, a deodorant, a flame retardant, an anti-weathering agent, an anti-static agent, a releasing agent, an antioxidant, an ion exchanger, a coloring pigment, and inorganic or organic particles, in such an amount so as not to have negative influences on the physical properties of the resin.

Examples of the plasticizer include phatalic acid ester plasticizers, such as phthalic acid diethyl, phthalic acid dioctyl, and phthalic acid dicyclohexyl; aliphatic dibasic acid ester plasticizers, such as adipic acid di-1-butyl, adipic acid di-n-octyl, sebacic acid di-n-butyl, and azelaic acid di-2-ethyl hexyl; phosphoric acid ester plasticizers, such as phosphoric acid diphenyl-2-ethyl hexyl and phosphoric acid diphenyl octyl; polyhydroxy carboxylic acid ester plasticizers, such as acetyl citric acid tributyl, acetyl citric acid tri-2-ethyl hexyl, and citric acid tributyl; aliphatic ester plasticizers, such as acetyl ricinoleic acid methyl, and stearic acid amyl; polyhydric alcohol ester plasticizers such as glycerin triacetate; and epoxy plasticizers, such as epoxylated soybean oil, epoxylated flaxseed oil, fatty acid butyl ester, and epoxylated stearic acid octyl. And the examples of the coloring pigments are inorganic pigments such as carbon black, titanium oxide, and zinc oxide; and organic pigments such as cyanines, phosphorous, quinines, perinones, isoindolinones, and thioindigos. Inorganic or organic particles may be used to improve the film in anti-blocking property, and the examples are silica, colloidal silica, alumina, alumina sol, talc, mica, calcium carbonate, polystyrene, poly methyl methacrylate, and silicon. Further, various additives applicable to polylactic acid resins or films thereof may be employed, and their kinds and acquisition routes are well known to those who skilled in the art.

The polylactic acid resin, for example, the block copolymer contained therein, may have a number average molecular weight of about 50,000 to 200,000, and preferably of about 50,000 to 150,000. Also, the polylactic acid resin may have a weight average molecular weight of about 100,000 to 400,000, and preferably about 100,000 to 320,000. The molecular weights influence the workability or mechanical properties of the polylactic acid resin. When the molecular weight is too small, the polylactic acid resin is poorly processed into films upon a melting process such as extrusion because its melt viscosity is too low and the film, although obtained, has poor mechanical properties such as strength. On the other hand, when the molecular weight is excessively high, the resin may be processed into a film with a poor yield in a melting process because its melt viscosity is too high.

The polylactic acid resin, for example, the block copolymer contained therein, may have a molecular weight distribution (Mw/Mn), defined as a ratio of weight average molecular weight (Mw) to number average molecular weight, of about 1.60 to 2.20, and preferably about 1.80 to 2.15. Given such a narrow molecular weight distribution, the polylactic acid resin has proper melt viscosity and melting properties so that it can be processed and extruded into films in a melting process. In addition, a high physical property such as strength can be found in the film made of the polylactic acid resin. In contrast, when the molecular weight distribution is too narrow (small), the polylactic acid resin may be difficult to process into a film because its melt viscosity is too high at a processing temperature for extrusion. On the other hand, when the molecular weight distribution is too wide (large), the film may become poor in physical properties such as strength, and the resin may be difficult to produce into films or may be poorly extruded into a film because its melt viscosity is too small.

Also, regarding the melting temperature (Tm) of the polylactic acid resin, the polylactic acid resin can have about the melting temperature (Tm) of 160 to 178° C., and preferably about 165 to 175° C. If the melting temperature is too low, the film made of the polylactic acid resin may be poor in heat resistance, and if the melting temperature is excessively high, the polylactic acid resin requires a high temperature for a melting process such as extrusion or increases the viscosity, thus making it difficult to extrude the resin into films. Being optimized in melting temperature as well as glass transition temperature, however, the polylactic acid resin exhibits excellent workability for a melting process and thus can be processed into packaging films with optimized flexibility and excellent physical properties including heat resistance.

The polylactic acid resin satisfies the relationship defined by the following Equation Formula 1:

about $75,000 \leq [(W_L/144.125)/(W_P/\text{Mw}_P)]*144.125 + \text{Mw}_P$ about $220,000$      [Equation Formula 1]

wherein $W_L$ and $W_P$ represent weight parts of the hard segment and the soft segment, respectively, based on 100 weight parts of the polylactic acid resin, and $\text{Mw}_P$ represents a number average molecular weight of the soft segment.

When the polylactic acid resin satisfies the relationship defined by Equation Formula 1 and its value falls within the range of about 75,000 to 220,000, or preferably within the range of about 80,000 to 200,000, the general properties of the resin, such as the contents of the hard segment and the soft segment, the molecular weight of each segment, and the molecular weight of the entire polylactic acid resin, can be optimized. Accordingly, the film made of the polylactic acid resin may be further improved in flexibility and can exhibit optimized physical properties for a packaging material, such as mechanical properties, transparency, heat resistance, antiblocking property and workability.

However, a polylactic acid resin which does not satisfy the relation defined by Equation Formula 1 is significantly poor in flexibility or mechanical properties, or cannot guarantee a proper melt viscosity and melting properties upon a melting process, such as extrusion, and thus, the workability of the resin into a film may be greatly deteriorated. Particularly, the polyurethane polyol repeating unit of the soft segment can act as an initiator to polymerize the polylactic acid repeating unit of the hard segment, and when the polylactic acid resin does not satisfy the relationship defined by Equation Formula 1, the initiator may not act properly or over-act. Thus, when the film is made by the polylactic acid resin which does not satisfy the relationship defined by Equation Formula 1, the film may exhibit very poor general physical properties such as mechanical properties and workability, or may have deteriorated flexibility due to an insufficient content of the soft segment.

Meanwhile, according to another embodiment of the invention, there is provided a method for preparing the polylactic acid resin. The method comprises: ring-opening polymerizing a monomer comprising at least one alkylene oxide to form a polymer having a polyether polyol repeating unit of the Chemical Formula 2; reacting the polymer having the polyether polyol repeating unit with a diisocyanate compound in the presence of a urethane reaction catalyst to form a polymer having a polyurethane polyol repeating unit in which the repeating units of Chemical Formula 2 are linearly linked via a urethane bond; and polycondensing a lactic acid or ring-opening polymerizing a lactide in presence of the polymer having the polyurethane polyol repeating unit to form a polylactic acid repeating unit of the Chemical Formula 1.

According to the preparation method, the polylactic acid resin can be made by the hard segment comprising the polylactic acid repeating units represented by Chemical Formula 1, and the soft segment comprising the polyurethane polyol repeating units. That is, the polyether polyol repeating units of Chemical Formula 2 can be linearly linked via a urethane bond (—C(═O)—NH—) as a result of a reaction with a diisocyanate compound. In addition, the terminal hydroxyl group of the polymer acts as an initiator for the polycondensation of the lactic acid or the ring-opening polymerization of lactide, thereby forming the polylactic acid repeating unit, and the polylactic acid resin comprising the polylactic acid repeating unit as a hard segment and the polyurethane polyol repeating unit as a soft segment can be prepared.

Particularly, the polylactic acid resin prepared using the method can exhibit physical properties, such as glass transition temperature, necessary for a packaging film according to an embodiment of the present invention, thus allowing the production of packaging films provided with excellent physical properties. Also, the polylactic acid resin according to the embodiment of the present invention can be produced at a high yield continuously.

The excellent properties such as the glass transition temperature cannot be measured in a polylactic acid resin which is prepared using a method other than the method of the embodiment of the present invention, for example, by introducing a polyester polyol repeating unit instead of the polyether polyol repeating unit, or by polymerizing polyether polyol with lactic acid before chain extension.

Controlling the molecular weight of the entire polylactic acid resin, the molecular weight of the polyether polyol, or the amount of the polyurethane polyol repeating unit-containing polymer corresponding to the content of the soft segment can be a main factor to prepare the polylactic acid resin satisfying the glass transition temperature mentioned above. In addition, the polylactic acid resin that satisfying the glass transition temperature and melting temperature mentioned above can be prepared by controlling the optical purity of the lactide isomers L-lactide and D-lactide, for example, to the more than about 98%, preferably about 99% and most preferably about 99.5%. But, the molecular weight of the polylactic acid resin and the content and optical purity of the soft segment, and their ranges are the same as described above, thus a detailed description thereof is omitted.

Below, the preparation method of polylactic acid resin will be explained in detail.

First, at least one monomer, such as alkylene oxide, can be (co)polymerized by ring-opening polymerization to form a (co)polymer having polyether polyol repeating units. This can be obtained using a typical polymerization method of polyether polyol (co)polymers.

Then, the (co)polymer having a polyether polyol repeating unit, an diisocyanate compound and a urethane reaction catalyst are loaded into a reactor, and subjected to a urethane reaction while heating and stirring. By this reaction, two isocyanate groups of the diisocyanate compound and the terminal hydroxyl groups of the (co)polymer can be combined to form urethane bonds. As a result, a (co)polymer having a polyurethane polyol repeating unit in which the polyether polyol repeating units are linearly linked via a urethane bond can be formed, and serve as a soft segment in the polylactic acid resin. In this context, the polyurethane polyol (co)polymer may be in the form of E-U-E-U-E in which the polyether polyol repeating units (E) are linearly linked via a urethane bond (U), and which has the polyether polyol repeating units at both terminal ends.

The urethane reaction may be obtained in the presence of a tin catalyst, for example, stannous octoate, dibutyltin dilaurate, or dioctyltin dilaurate. In addition, the urethane reaction can be obtained under the typical reaction condition for the preparation of polyurethane resin. For example, the diisocyanate compound and the polyether polyol (co)polymer can be reacted at 70-80° C. for 1-5 hrs in the presence of a urethane reaction catalyst in a nitrogen atmosphere to afford a (co)polymer having a polyurethane polyol repeating unit.

Subsequently, a polylactic acid resin according to an embodiment of the present invention, particularly in a block copolymer, can be obtained by polycondensing the lactic acid (D or L) or ring-opening polymerizing lactide (D or L) in presence of the (co)polymer having a polyurethane polyol repeating unit. That is, during this polymerization, a polylactic acid repeating unit is formed as a hard segment to produce the polylactic acid resin in which at least a part of the polylactic acid repeating unit is associated with the polyurethane polyol repeating unit to form a block copolymer. For example, the terminal carboxyl group of the polylactic acid repeating unit may form an ester bond with the terminal hydroxyl group of the polyurethane polyol repeating unit to produce the block copolymer. As a result, the block copolymer according to an embodiment of the present invention can be obtained which is quite different in structure and glass transition temperature from conventional polylactic copolymers or branched copolymers which are prepared from a prepolymer consisting of a polyether polyol and a polylactic acid by chain extension with a diisocyanate compound or by reaction with a tri-functional isocyanate compound, respectively. Particularly, the block copolymer according to an embodiment may comprise a block (hard segment) in which the polylactic acid repeating units are linked to each other in a relatively large mass (molecular weight) unit, so that a film made of the polylactic acid resin comprising the block copolymer may have a narrow molecular weight distribution and a proper Tg, and thus may exhibit excellent mechanical properties and heat resistance. In contrast, because the conventional copolymers should have a structure in which polylactic acid repeating units with a small mass (molecular weight) are alternately and randomly distributed together with polyether polyol repeating units, films obtained therefrom cannot satisfy the aforementioned properties such as glass transition temperature, and have poor mechanical properties or heat resistance.

The ring opening polymerization of lactide may be performed in the presence of a metal catalyst such as an alkaline earth metal, a rare earth metal, a transition metal, aluminum, germanium, tin, or antimony. More specifically, the metal catalyst may be in the form of carbonic acid salts, alkoxide, halide, oxide, or titanium tetraisopropoxide carbonate. Stannous octoate, titanium tetraisopropoxide, or aluminum tri-isopropoxide can be used as metal catalyst preferably. As described above, the catalyst can be used together with an antioxidant, so as to prevent the polylactic acid resin from undergoing yellowing and to guarantee an excellent appearance of the polylactic acid resin.

Also, the formation of the polylactic acid repeating unit by, for example, the ring opening polymerization of lactide, may be carried out continuously in the same reactor as the urethane reaction. That is, a polyether polyol polymer may be reacted with a diisocyanate to form a polymer having a polyurethane polyol repeating unit, thereafter monomers such as lactide and a catalyst may be added to the same reactor to form the polylactic acid repeating unit. In this regard, the polymer having a polyurethane polyol repeating unit may act as an initiator, thereby allowing the successive production of the polylactic acid repeating unit and the polylactic acid resin at a high yield.

As comprising a block copolymer comprising the hard segments and soft segments, the polylactic acid resin can be biodegradable and exhibit improved flexibility. Further, this structure can minimize the bleed-out of the soft segment which is responsible for the flexibility, and can prevent the soft segment-induced reduction of mechanical properties, heat resistance, transparency or haze property.

Moreover, being designed to have desired physical properties including glass transition temperature and optionally melting temperature, the polylactic acid resin of the present invention may guarantee optimized flexibility and stiffness for the film made thereof, and exhibit excellent workability for a melting process, anti-blocking property, and heat resistance. Accordingly, the polylactic acid resin may be preferably applied to packaging materials such as packaging films.

Thus, according to another embodiment of the invention, there is provided a packaging film comprising the polylactic acid resin. The packaging film made of the polylactic acid resin may have superior mechanical properties, heat resistance, anti-blocking property and transparency, and exhibit optimized flexibility and stiffness to be applied to the packaging film in various fields.

The packaging film may have various thickness depending on uses thereof, and thickness of 5 to 500 µm. For example, when the packaging film is used as a wrap film or an envelope, it preferably may have a thickness of 5 to 100 µm in terms of flexibility, workability and strength, more preferably 7 to 50 µm, and further more preferably 7 to 30 µm.

And, when the packaging film with dimensions of a width of 10 mm and a length of 150 mm is subjected to a tensile test using Instron 1123 UTM at a temperature of 20° C., a relative humidity of 65%, and a drawing speed of 300 mm/min with a distance between grips of 100 mm, the packaging film may exhibit a total Young's modulus in both machine direction and transverse direction of about 350 to 750 kgf/mm$^2$, preferably about 450 to 650 kgf/mm$^2$, and more preferably about 500 to 600 kgf/mm$^2$. This range of total Young's modulus can reflect the optimized flexibility and stiffness of the packaging films, which seems to result from the structural characteristics and glass transition temperature satisfied in the polylactic acid resin.

However, when the total Young's modulus is too low, the film may undergo spreading or loosing phenomena during a film formation process, and exhibit poor workability, gas permeability, slipping property, or dimensional stability. In addition, the deficient slipping property causes a poor release property, making it difficult to use the film as a wrap film. The total Young's modulus of a film which is smaller than the lower limit is unable to properly pack a subject such as a vessel, a good or a food because it may deform before wrapping the subject. On the other hand, when the total Young's modulus of the film is too high, a folding line may remain giving a poor appearance once it is formed in the film during packaging, or the film may make it difficult to packaging because the film is not easily folded after the shape of the subject to be packaged.

And, the packaging film may have an initial tensile strength of 10 kgf/mm$^2$ or higher in both machine direction and transverse direction, preferably an initial tensile strength of about 12 kgf/mm$^2$ or higher, and more preferably an initial tensile strength of about 15 kgf/mm$^2$ to about 30 kgf/mm$^2$, as measured under the same conditions as for Young's modulus. If the initial tensile strength does not reach the lower limit, the film may exhibit poor workability and be easily tore, giving high risk of damaging the content packaged therewith.

Also, when it is treated for 1 hr in a 100° C. hot wind oven, the packaging film may exhibit a weight loss of about 3 wt % or less, preferably about 0.01 to 3.0 wt %, and more preferably about 0.05 to 1.0 wt %. This property may indicate that the packaging film may have excellent heat resistance and anti-bleed out properties. When the rate of weight loss is higher than 3 wt %, the film may have poor dimensional stability, and plasticizers, residual monomers, or additives can bleed out of the film, polluting the content packaged with the film.

The packaging film may exhibit haze of about 3% or less and light transmittance of about 85% or higher. Preferably, it may have haze of about 2% or less with light transmittance of about 90% or higher, and more preferably haze of about 1% or less with light transmittance of about 92% or higher. If the haze is too high or the light transmittance is too low, the film may make it difficult to readily identify the content packaged therewith, and do not allow vivid appearance of a printed image when it is applied to a multilayer film having a print layer.

The packaging film may be provided a property necessary for food packaging materials such as heat sealability, gas barrier against water vapor, oxygen or carbonic acid gas, releasability, printability, and the like which is required for the packaging film, so long as not deteriorating the advantages of the packaging film. For this, the polymer responsible for such a property may be compounded with the film or a thermoplastic resin such as an acryl resin, a polyester resin, a silicon resin, a polyester resin, or a silicon resin, or an antistatic agent, a surfactant, and/or a releasing agent may be applied to at least one surface of the packaging film. Also, the packaging film may be formed into a multilayer film by coextrusion of other films such as polyolefin sealant. The packaging film may be formed into a multilayer film by adhesion or lamination as well.

Meanwhile, a typical method may be used to manufacture the packaging film mentioned above. For example, the polylactic acid resin may be formed into an oriented film (a drawn film) by an inflation process, a sequential biaxial stretching process, or a concurrent biaxial stretching process, followed by heat setting. In this regard, the formation of an oriented film may be accomplished by melt extruding the polylactic acid resin into sheets structure using an extruder equipped with a T die, thereafter cooling and solidifying the sheet-like extrudate to form an unoriented film (undrawn film), and stretching the unoriented film in both machine direction and transverse direction.

Drawing conditions of the film may be properly adjusted depending on heat shrinkability, dimensional stability, strength, and Young's modulus. For example, in consideration of the strength and flexibility of the final product, the drawing temperature may be preferably adjusted into a point between the glass transition temperature and the crystallization temperature of the polylactic acid resin. In addition, the drawing ratio may be set to be about 1.5 to 10 times for each direction, or may differ from the machine direction to the transverse direction.

After the formation of the oriented film, the packaging film may be finally accomplished by heat setting, and the heat setting is preferably performed at 100° C. or higher for about 10 sec for the strength and dimensional stability of the film.

Even after being stored for a long period time, the packaging film may have excellent flexibility and transparency, and exhibit sufficient mechanical properties such as strength and anti-bleed out property. In addition, the film may have biodegradability which is characteristic of the polylactic acid resin.

Therefore, the packaging film may be preferably applied to various packaging fields. For example, the packaging film may be applied to industrial packaging materials including agricultural multi-films, sheets for protecting paint on automobiles, trash envelopes, and compost envelopes in addition to being used as, for example, wrappers and envelopes for daily consumption goods or foods, and chilled/frozen foods, shrinkable over-wrapping films, bundling films, sanitary films such as sanitary pads or diapers, and mat films for packaging confectioneries.

Advantageous Effect of the Invention

As described above, the present invention provides a polylactic acid resin and a packaging film which has biodegradability which is characteristic of polylactic acid resin and is optimized in flexibility and stiffness while exhibiting excellent physical properties including mechanical properties, heat resistance, transparency, anti-blocking property, and anti-bleed out property. Therefore, the polylactic acid resin and the packaging film can be applied to the various fields as packaging materials, replacing packaging films made of petroleum-based resins and making a great contribution to prevention of environmental pollution.

DETAILS FOR PRACTICING THE INVENTION

The present invention will be explained in detail with reference to the following examples. However, these examples are only to illustrate the invention, and the scope of the invention is not limited thereto.

* Definitions of Physical Properties and Measuring Methods: physical properties stated in the following Examples are defined and measured as follows.

(1) NCO/OH: molar ratio of "isocyanate group of diisocyanate compound (e.g., hexamethylene diisocyanate)/terminal hydroxyl group of polyether polyol repeating unit (or (co)polymer)" for a reaction to form polyurethane polyol repeating units.

(2) OHV (KOH mg/g): measured by dissolving the polyurethane polyol repeating unit (or (co)polymer) in dichloromethane, acetylating the repeating unit, hydrolyzing the acetylated repeating unit to generate acetic acid, and titrating the acetic acid with 0.1 N KOH in methanol. It corresponds to the number of terminal hydroxyl groups of the polyurethane polyol repeating units (or (co)polymer).

(3) Mw and Mn (g/mol) and molecular weight distribution (Mw/Mn): measured by applying a 0.25 wt % solution of polylactic acid resin in chloroform, and gel permeation chromatography (manufactured by Viscotek TDA 305, Column: Shodex LF804*2ea). Polystyrene was used as a standard material to determine weight average molecular weight (Mw) and number average molecular weight (Mn). A molecular weight distribution was calculated from Mw and Mn.

(4) Tg (glass transition temperature, ° C.): measured with a differential scanning calorimeter (manufactured by TA Instruments) while quenching the melted sample and then increasing the temperature of the sample at a rate of 10° C./minute. The Tg was determined from the mid value of tangential line of an endothermic curve and a base line.

(5) Tm (melting temperature, ° C.): measured with a differential scanning colorimeter (manufactured by TA Instruments) while quenching the melted sample and then elevating the temperature of the sample at a rate of 10° C./min. The Tm was determined from the maximum value of the melt endothermic peak of the crystal.

(6) $Mw_p$ (g/mol) and Equation Formula 1: $Mw_p$ was measured by applying a 0.5 wt % solution of polyurethane polyol repeating unit (or (co)polymer) in THF and gel permeation chromatography (manufactured by Viscotek TDA 305, Column: Shodex LF804*2ea). Polystyrene was used as a standard material to determine the number average molecular weight ($Mw_p$) of the soft segment. The number average molecular weight of the soft segment and the content of each segment were substituted into Equation Formula 1 to calculate the value.

$$75{,}000 \leq [(W_L/144.125)/(W_P/Mw_P)]*144.125 + Mw_P \leq 220{,}000 \quad \text{[Equation Formula 1]}$$

wherein, $W_L$ and $W_P$ are weight parts of a hard segment and a soft segment, respectively, based on 100 weight parts of the polylactic acid resin, and $Mw_p$ is a number average molecular weight of the soft segment.

(7) Content of polyurethane polyol repeating unit (wt %): The content of polyurethane polyol repeating unit in prepared polylactic acid resin was measured using a 600 MHz nuclear magnetic resonance (NMR) spectrometer.

(8) Extrusion state and melt viscosity: The polylactic acid resin was extruded at 200~250° C. into a sheet phase using a 30 mm single screw extruder equipped with a T die, and the extrudated sheet was electrostatically deposited on a casting drum cooled to 5° C. At this time, the melt viscosity of the extrudated sheet was measured using Physica Rheometer (Physica, USA). In detail, while maintaining the initial temperature of the extrudate, a shear force was applied thereto by a 25 mm parallel plate type instrument with a shear rate (1/s) of 1 during which complex viscosity (Pa·s) of the melted resin was measured with the Physica Rheometer. The states of melt viscosity (extrusion states) were evaluated according to the following standards.

◎: melt viscosity is good enough to perform winding around the cooling drum, ○: melt viscosity is slightly low and winding is possible although difficult, x: melt viscosity is too low to wind.

(9) Initial tensile strength (kgf/mm$^2$) MD, TD: A film sample with 150 mm in length and 10 mm in width was conditioned at a temperature of 20° C. and a humidity of 65% RH for 24 hrs, and measured the tensile strength according to ASTM D638 using Universal test machine (manufactured by INSTRON) at a drawing speed of 300 mm/min with the distance of 100 mm between grips. A mean value of five measurements was expressed. MD and TD stand for machine direction and transversal direction of the film, respectively.

(10) Elongation ratio (%) MD, TD: The elongation ratio was determined at the point when the film was torn under the same condition as in the tensile strength test of (9). A mean value of five measurements was expressed. MD and TD stand for machine direction and transversal direction of the film, respectively.

(11) F5 (kgf/mm$^2$) MD, TD: In the stress-strain curve obtained in the tensile strength test of (9), a tangential value at a stress point of 5% strain was determined, and a stress value at 5% elongation was obtained from the tangential slope. A mean value of five measurements was expressed. MD and TD stand for machine direction and transversal direction of the film, respectively.

(12) F100 (kgf/mm$^2$) MD: In the stress-strain curve obtained in the tensile strength test of (9), a tangent value at a stress point of 100% strain was determined, and a stress value at 100% elongation was obtained from the tangential slope. A mean value of five measurements was expressed. MD and TD stand for machine direction and transversal direction of the film, respectively.

(13) Young's modulus (kgf/mm$^2$) MD, TD: The same film sample as in the tensile strength test of (9) was measured for Young's modulus according to ASTM D638 using UTM (manufactured by INSTRON) at a drawing speed of 300 mm/min with a distance between grips of 100 mm. A mean value of five measurements was expressed. As the Young's modulus, particularly, a sum of Young's modulus values measured in machine direction and transversal direction, corresponds to the flexibility of the film, a lower Young's modulus value may indicate higher flexibility. MD and TD stand for machine direction and transversal direction of the film, respectively.

(14) Wave pattern (horizontal line): Degrees of the wave patterns which are produced due to a difference in melt viscosity when two kinds of resins with different molecular weights or a resin and a plasticizer are compounded and extruded into a film are evaluated on an A4-size film sample according to the following criteria.

◎: no wave patterns (horizontal lines), ○: Up to 3 wave patterns (horizontal lines), x: 5 or more wave patterns (horizontal lines).

(15) 100° C. Rate of weight loss (%): A film sample was conditioned for 24 hrs at 23° C. and 65% RH and weighed before heat treatment. Then, it was treated for 60 min in a 100° C. hot wind oven, and again conditioned under the same conditions as in pre-heat treatment, and weighed. Percentages of the pre-treatment weight to the changes between pre- and post-treatment processes were calculated.

(16) Pin hole and anti-bleed-out: After the heat treatment of (15), the surface of the film sample was observed to examine the generation of pin holes. In addition, the bleed-out of the low-molecular weight plasticizer on the film surface was evaluated with tactile sensation on an A4-size film sample according to the following criteria.

◎: neither pin holes nor bleed-out, ○: up to 5 pin holes or bleed-out observed, but not serious, x: 5 or more pin holes or serious bleed-out.

(17) Haze (%) and light transmittance (%): A film sample was conditioned for 24 hrs at 23° C. and 65% RH, and the average haze value was measured at three different points according to JIS K7136 using a haze meter (Model Japan NDH2000).

(18) Anti-blocking property: The antistatic surface of a film sample was matched with the print surface by using COLORIT P type stamping of foil (Kurz), and left for 24 hrs at 40° C. under a pressure of 1 kg/cm$^2$, thereafter the blocking between the antistatic layer and the print surface was observed. Based on the observation, the anti-blocking property of the film between the anti-static layer (layer A) and the print surface of the in-mold transfer foil was evaluated according to the following criteria. Practical performance is guaranteed by at least ○.

◎: no changes, ○: slight surface change (less than 5%), x: defoliated by 5% or higher.

Materials used in the following Examples and Comparative Examples are given as follows:

1. Polyether polyol repeating unit (or (co)polymer) or correspondents thereto

PPDO 2.4: poly(1,3-propanediol); number average molecular weight 2400

PPDO 2.0: poly(1,3-propanediol); number average molecular weight 2000
PPDO 1.0: poly(1,3-propanediol); number average molecular weight 1000
PTMEG 3.0: polytetramethylene glycol; number average molecular weight 3000
PTMEG 2.0: polytetramethylene glycol; number average molecular weight 2000
PTMEG 1.0: polytetramethylene glycol; number average molecular weight 1000
PEG 8.0: polyethylene glycol; number average molecular weight 8000
PBSA 11.0: 1,4-butanediol, and aliphatic polyester polyol prepared from succinic acid and adiphic acid by condensation; number average molecular weight 11,000
2. Diisocyanate compound (or tri- or higher functional isocyanate)
HDI: hexamethylenediisocyanate
D-L75: Bayer, Desmodur L75 (TRIMETHYLOL PROPANE+3 toluene diisocyanate)
3. Lactide monomer
L- or D-lactide: product form Purac, optical purity of 99.5% or higher
4. Antioxidants, etc.
TNPP: Tris(nonylphenyl) phosphite
U626: Bis(2,4-di-tbutylphenyl) pentaerythritol diphosphite
S412: Tetrakis[methane-3-(laurylthio)propionate]methane
PEPQ: (1,1'-Biphenyl)-4,4'-diylbisphosphonous acid tetrakis[2,4-bis(1,1-dimethylethyl)phenyl]ester
I-1076: octadecyl 3-(3,5-di-tert-butyl-4-hydroxyphenyl) propionate
O3: Bis[3,3-bis-(4'-hydroxy-3'-tert-butyl-phenyl)butanoic acid]glycol ester A. Preparation of Polylactic Acid Resins A~E, J and N According to the instructions shown in Table 1 below, reactants and catalyst were prepared in 8 L reactor equipped with a nitrogen tube, a stirrer, a catalyst inlet, an effluent condenser and a vacuum system. As the catalyst, dibutyltin dilaurate was used in an amount of 130 ppmw based on the total weight of the reactants. Under a nitrogen atmosphere, a urethane reaction was carried out at 70° C. for 2 hrs, and then 4 kg of L- or D-lactide was fed into the reactor, followed by five times of nitrogen flushing.

Subsequently, the temperature was elevated to 150° C. to completely dissolve the L- or D-lactide, and a solution of 120 ppmw of the catalyst tin 2-ethylhexylate in 500 ml of toluene was introduced into the reactor through the catalyst inlet. Under a nitrogen pressure of 1 kg, the reaction was carried out at 185° C. for 2 hrs, after which phosphoric acid was fed in an amount of 200 ppmw through the catalyst inlet and blended with the reaction mixture to inactivate the catalyst. After the catalyst deactivation, the vacuum was applied until the pressure reached 0.5 torr to remove unrelated L- or D-lactide (about 5 wt % of the initially fed weight). The molecular weight parameters, conformity to the relation defined by Math Formula 1, and Tm and Tg of the final product were measured and given in Table 1.

B. Preparation of Polylactic Acid Resin L

According to the instructions shown in Table 1 below, polyol and 4 kg of L-lactide were fed into an 8 L reactor equipped with a nitrogen tube, a stirrer, a catalyst inlet, an effluent condenser and a vacuum system, followed by five times of nitrogen flushing. Subsequently, the temperature was elevated to 150° C. to completely dissolve the L-lactide, and a dilution of 120 ppmw of the catalyst tin 2-ethylhexylate in 500 ml of toluene was introduced into the reactor through the catalyst inlet. Under a nitrogen pressure of 1 kg, the reaction was carried out at 185° C. for 2 hrs, after which phosphoric acid was fed in an amount of 200 ppmw through the catalyst inlet and blended with the reaction mixture to inactivate the catalyst. Until the pressure reached 0.5 torr, vacuum was applied to remove unreacted L-lactide. The molecular weight parameters, conformity to the relation defined by Math Formula 1, and Tm and Tg of the final product were measured and given in Table 1.

C. Preparation of Polylactic Acid Resin M

According to the instructions shown in Table 1 below, 6 g of 1-dodecanol and 4 kg of L-lactide were fed into an 8 L reactor equipped with a nitrogen tube, a stirrer, a catalyst inlet, an effluent condenser and a vacuum system, followed by five times of nitrogen flushing. Subsequently, the temperature was elevated to 150° C. to completely dissolve the L-lactide, and a dilution of 120 ppmw of the catalyst tin 2-ethylhexylate in 500 ml of toluene was introduced into the reactor through the catalyst inlet. Under a nitrogen pressure of 1 kg, the reaction was carried out at 185° C. for 2 hrs, after which phosphoric acid was fed in an amount of 200 ppmw through the catalyst inlet and blended with the reaction mixture to inactivate the catalyst. Until the pressure reached 0.5 torr, vacuum was applied to remove unreacted L-lactide. The molecular weight parameters, conformity to the relation defined by Math Formula 1, and Tm and Tg of the final product were measured and given in Table 1.

D. Preparation of Polylactic Acid Resin

According to the instruction shown in Table 1 below, PBSA polyol(polyester polyol) and HDI were fed into an 8 L reactor equipped with a nitrogen tube, a stirrer, a catalyst inlet, an effluent condenser and a vacuum system, followed by five times of nitrogen flushing. As a catalyst, dibutyltin dilaurate was used in an amount of 130 ppmw based on the total weight of the reactants. Under a nitrogen atmosphere, a urethane reaction was carried out at 190° C. for 2 hrs, and then 4 kg of L-lactide was fed into the reactor, and completely dissolved at 190° C. in a nitrogen atmosphere. Tin 2-ethylhexylate as an addition polymerization catalyst, and dibutyltin dilaurate as an ester and/or ester amide exchange catalyst were diluted in amounts of 120 ppmw and 1000 ppmw, respectively, based on the total weight of the reactants, in 500 ml of toluene, and added to the reactor. Under a nitrogen pressure of 1 kg, the reaction was carried out at 190° C. for 2 hrs, after which phosphoric acid was fed in an amount of 200 ppmw through the catalyst inlet and blended with the reaction mixture to inactivate the catalysts. Until the pressure reached 0.5 torr, vacuum was applied to remove unreacted L-lactide (about 5 wt % of the initial amount). The molecular weight parameters, conformity to the relation defined by Math Formula 1, and Tm and Tg of the final product were measured and given in Table 1.

E. Preparation of Polylactic Acid Resin P

According to the instructions shown in Table 1 below, PEG, and 3.6 kg of L-lactide and 0.4 kg of D-lactide, were fed into an 8 L reactor equipped with a nitrogen tube, a stirrer, a catalyst inlet, an effluent condenser and a vacuum system, followed by five times of nitrogen flushing. Subsequently, the temperature was elevated to 150° C. to completely dissolve the lactides, and a dilution of 120 ppmw of the catalyst tin 2-ethylhexylate in 500 ml of toluene was introduced into the reactor through the catalyst inlet. Under a nitrogen pressure of 1 kg, the reaction was carried out at 185° C. for 2 hrs, after which phosphoric acid was fed in an amount of 200 ppmw through the catalyst inlet and blended with the reaction mixture to inactivate the catalyst. Until the pressure reached 0.5 torr, vacuum was applied to remove unreacted L-lactide (about 5 wt % of the initial amount). Then, HDI and a dilution of 120 ppmw of the dibutyltin dilaurate in 500 ml of toluene were introduced through the catalyst inlet into the reactor as shown in Table 1. Under a nitrogen atmosphere, the polymerization was carried out at 190° C. for 1 hr. The molecular weight parameters, conformity to the relation defined by Math Formula 1, and Tm and Tg of the final product were measured and given in Table 1.

F. Preparation of Polylactic Acid Resin Q

According to the instructions shown in Table 1 below, PEG, and 3.6 kg of L-lactide and 0.4 kg of D-lactide, were fed into an 8 L reactor equipped with a nitrogen tube, a stirrer, a catalyst inlet, an effluent condenser and a vacuum system, followed by five times of nitrogen flushing. Subsequently, the temperature was elevated to 150° C. to completely dissolve the lactides, and a dilution of 120 ppmw of the catalyst tin 2-ethylhexylate in 500 ml of toluene was introduced into the reactor through the catalyst inlet. Under a nitrogen pressure of 1 kg, the reaction was carried out at 185° C. for 2 hrs, after which phosphoric acid was fed in an amount of 200 ppmw through the catalyst inlet and blended with the reaction mixture to inactivate the catalyst. Until the pressure reached 0.5 torr, vacuum was applied to remove unreacted L-lactide (about 5 wt % of the initial amount). Then, D-L75 and a dilution of 120 ppmw of the dibutyltin dilaurate in 500 ml of toluene were introduced through the catalyst inlet into the reactor as shown in Table 1. Under a nitrogen atmosphere, the polymerization was carried out at 190° C. for 1 hr. The molecular weight parameters, conformity to the relation defined by Math Formula 1, and Tm and Tg of the final product were measured and given in Table 1.

G. Examples 1 to 5 and Comparative Examples 1 and 5 to 8: Film Formation

The polylactic acid resins prepared in A to F were dried at 80° C. for 6 hrs under a reduced pressure of 1 torr, and then extruded into sheets structures using a 30-mm single screw extruder equipped with a T die under the temperature conditions shown in Table 2. The extruded sheets were electrostatically deposited on a casting drum cooled to 5° C. to give unoriented films (undrawn films). They were stretched to 3 times in a machine direction between heating roles under the drawing conditions shown in Table 2. Subsequently, the films were fixed with clips, then stretch to 4 times in a tenter frame, and fixed again in the transverse direction, followed by heat treatment at 120° C. for 60 sec to afford a bi-axially oriented polylactic acid resin film of 20 μm thick. The evaluation results of the films are summarized in Table 2.

H. Example 6 and Comparative Examples 2 to 4 Film Formation

The resin compositions or polyols shown in Table 2 were dried at 80° C. for 6 hrs under a reduced pressure of 1 torr, and melt kneaded at 190° C. in a twin screw kneader to give chips of the composition. They were dried at 80° C. for 6 hrs under a reduced pressure of 1 torr, and produced into a bi-axially oriented polylactic acid resin film of 20 μm thick in the same manner as in G. The evaluation results of the films are summarized in Table 2.

TABLE 1

| | Resin | | | | | |
|---|---|---|---|---|---|---|
| | A | B | C | D | E | J |
| PPDO 2.4 (g) | | 378.8 | | | | |
| PPDO 2.0 (g) | | | | | | 947.3 |
| PPDO 1.0 (g) | | | 209.5 | | | |
| PTMEG 3.0 (g) | 386.9 | | | | | |
| PTMEG 2.0 (g) | | | | | 755.5 | |
| PTMEG 1.0 (g) | | | | 184.8 | | |
| PEG 8.0 (g) | | | | | | |
| PBSA 11.0 (g) | | | | | | |
| HDI (g) | 13.1 | 21.2 | 30.5 | 15.2 | 44.4 | 52.6 |
| D-L75 (g) | | | | | | |
| NCO/OH | 0.6 | 0.8 | 0.9 | 0.50 | 0.70 | 0.65 |
| OHV(KOHmg/g) | 10 | 6 | 4 | 20 | 6 | 8 |
| Soft Segment Mw ($Mw_p$) | 10K | 14K | 12K | 4.5K | 15K | 14K |
| Equation Formula 1 | 100000 | 140000 | 200000 | 90000 | 88235 | 66667 |
| TNPP (g) | | | 4 | | | |
| U626 (g) | 2 | 3 | | | | |
| PEPQ (g) | | | | 4 | | |
| S412 (g) | | | | 2 | | |
| I-1076 (g) | | 1 | | | | |
| O3 (g) | 2 | | | | | |
| L-Lactide (g) | 4000 | | 4000 | | 4000 | 4000 |
| D-Lactide (g) | | 4000 | | 4000 | | |
| IV (dl/g) | 0.95 | 1.35 | 1.52 | 0.64 | 0.92 | 0.52 |
| Mn (×1,000, g/mol) | 75 | 122 | 148 | 60 | 70 | 41 |
| Mw (×1,000, g/mol) | 148 | 245 | 315 | 115 | 149 | 78 |
| MWD | 1.97 | 2.01 | 2.13 | 1.92 | 2.13 | 1.90 |
| Tg (° C.) | 49 | 42 | 54 | 55 | 31 | 24 |
| Tm (° C.) | 170 | 168 | 172 | 173 | 164 | 165 |
| PU polyol repeating unit Content (wt %) | 10% | 10% | 6% | 5% | 17% | 21% |

TABLE 1-continued

| | Resin | | | | | |
|---|---|---|---|---|---|---|
| | L | M | N | O | P | Q |
| PPDO 2.4 (g) | | | 150.3 | | | |
| PPDO 2.0 (g) | | | | | | |
| PPDO 1.0 (g) | | | | | | |
| PTMEG 3.0 (g) | | | | | | |
| PTMEG 2.0 (g) | | | | | | |
| PTMEG 1.0 (g) | | | | | | |
| PEG 8.0 (g) | 2400 | | | | 800 | 800 |
| PBSA 11.0 (g) | | | | 800 | | |
| HDI (g) | | 9.7 | | 9.5 | 10.1 | |
| D-L75 (g) | | | | | | 14.9 |
| NCO/OH | | 0.92 | | 0.8 | 0.7 | 0.65 |
| OHV(KOHmg/g) | 47 | | 2.5 | 3 | 5.5 | 5.5 |
| Soft Segment Mw ($Mw_p$) | 8K | — | 40K | 11K | 8K | 8K |
| Equation Formula 1 | 20513 | — | 1000000 | 61111 | 44444 | 47059 |
| TNPP (g) | | | 5 | | | |
| U626 (g) | | 3 | | | | |
| PEPQ (g) | | | | | | |
| S412 (g) | | | | | | |
| I-1076 (g) | | | | | | |
| O3 (g) | | | | | | |
| L-Lactide (g) | 4000 | 4000 | 4000 | 4000 | 3600 | 3600 |
| D-Lactide (g) | | | | | 400 | 400 |
| IV (dl/g) | 0.2 | 1.55 | — | — | — | — |
| Mn (×1,000, g/mol) | 14 | 128 | 170 | 65 | 60 | 55 |
| Mw (×1,000, g/mol) | 26 | 295 | 410 | 185 | 150 | 215 |
| MWD | 1.86 | 2.30 | 2.41 | 2.85 | 2.50 | 3.91 |
| Tg (° C.) | 15 | 65 | 58 | 18 | 22 | 17 |
| Tm (° C.) | 130 | 176 | 174 | 85, 165 | 145 | 142 |
| PU polyol repeating unit Content (wt %) | 39% | 0% | 4% | 18% | 18% | 17% |

As shown in the Table 1, resins A~E were polylactic acid resins (block copolymers) which were prepared by reacting poly(1,3-propanediol) of a molecular weight of 1000~2400 or polytetramethylene glycol of a number average molecular weight of 1000~3000 with 1,6-hexamethylene diisocyanate at a molar ratio of NCO/OHV of 0.5~0.99 to give a polyurethane polyol repeating unit (or (co)polymer) in which polyether polyol repeating units, such as poly(1,3-propanediol), were linearly linked via a urethane bond, and which was used as a soft segment and as an initiator for the polymerization of a hard segment. In addition, the polylactic acid resins comprise the soft segment consisting of the polyurethane polyol repeating units in a proper amount of 5~20 wt % and its value of Equation Formula 1 is within the range of 80,000 to 200,000, satisfying the relationship defined by Equation Formula 1.

In the polylactic acid resins, the polyurethane polyol repeating unit (or (co)polymer) was found to have an OHV of from 3 to 20, so that they could act as an initiator for the polymerization of polylactic acid repeating units. In addition, the final polylactic acid resins A~E had a weight average molecular weight of 100,000 to 400,000 with a molecular weight distribution of 1.80 to 2.15, and ranging in Tg 25 to 55° C. and in Tm 160 to 178° C. Given these thermal parameters, the resin can be prepared into chips, and they alone can be produced into films, as the resins exhibit a suitable melt viscosity at a film extrusion temperature, e.g., 200° C. or higher.

In contrast, as resin J comprises the polyurethane polyol repeating units (or (co)polymer) in an amount exceeding 20 wt %, its value of Equation Formula 1 is 66,667, and thus cannot satisfy the relationship defined by Equation Formula 1. In addition, the final polylactic acid resin has a weight average molecular weight of less than 100,000 with a glass transition temperature of less than 25° C.

And, resin L was the polylactic acid resin which was prepared by directly utilizing a polyethylene glycol with a molecular weight of 8000 as an initiator for the ring-opening polymerization of L-lactide, without a urethane reaction. In this case, however, the OHV of the initiator was too high to obtain a polylactic acid resin with a desired weight average molecular weight. Further, resin L had a Tg of as low as 15° C., did not satisfy the relationship defined by Equation Formula 1, and exhibited poor polymerization conversion. At a film extrusion temperature, e.g., 200° C. or higher, the resin was too low in melt viscosity so that it could not be produced into a film alone.

Resin M was the polylactic acid resin which was prepared from L-lactide by ring opening polymerization without the introduction of a soft segment (polyurethane polyol repeating unit) while a small amount of 1-dodecanol was used as an initiator. This polylactic acid resin alone could be produced into a film at a film extrusion temperature of 200° C. or higher. However, it was found to have a molecular weight distribution of as large as 2.30 which is very broad.

Although resin N was a polylactic acid resin and prepared by obtaining polyurethane polyol repeating unit (or (co) polymer) and utilizing it as a soft segment and an initiator, it comprised the soft segment in as low an amount as 5 wt % or less, and value of the Equation Formula 1 was 1,000,000, which does not satisfy the relationship defined by Equation Formula 1. This polylactic acid resin was found to have a weight average molecular weight exceeding 400,000 and a molecular weight distribution as 2.41 which is very broad as well.

Resin O was the polylactic copolymer which was prepared by employing a polyurethane formed from a polyester polyol repeating unit, such as PBSA, instead of the polyether polyol repeating unit, as a soft segment while copolymerizing the polyurethane with lactide in the presence of a ring opening polymerization catalyst, an ester exchange catalyst, and/or an ester amide exchange catalyst. In this polylactic copolymer, the polyurethane was randomly introduced in small segment sizes and copolymerized with the polylactic acid repeating unit during the ester and/or ester amid exchange reaction. Resin O had as wide a molecular weight distribution as 2.85, and its Tg was excessively lower than that of the present invention, and so the Tm was relatively low as well.

Finally, resins P and Q were a polylactic copolymer (P) or a branched copolymer (Q) which were prepared by addition polymerization of polyether polyol repeating units with lactide to form a prepolymer and then by subjecting the prepolymer to chain extension with a diisocyanate compound (copolymer P) or to a reaction with a tri-functional isocyanate compound (copolymer Q), respectively. Resins P and Q had as wide a molecular weight distribution as 2.50 and 3.91, and their Tg was excessively lower than that of the present invention, and so the Tm was relatively low as well.

TABLE 2

| | Example | | | | | | Comparative Example | | | | | | | |
|---|---|---|---|---|---|---|---|---|---|---|---|---|---|---|
| | 1 | 2 | 3 | 4 | 5 | 6 | 1 | 2 | 3 | 4 | 5 | 6 | 7 | 8 |
| Resin 1 (wt %) | A 100 | B 100 | C 100 | D 100 | E 100 | E 50 | M 100 | L 40 | PDO 10 | PBSA 10 | N 100 | O 100 | P 100 | Q 100 |
| Resin 2 (wt %) | | | | | | M 50 | | M 60 | M 90 | M 90 | | | | |
| Extrusion Temp. (° C.) | 220 | 230 | 240 | 200 | 200 | 240 | 240 | 200 | 200 | 200 | 250 | 200 | 200 | 240 |
| Melt Visco. (Pa · s) | 1100 | 1600 | 2100 | 580 | 1000 | 1400 | 2000 | 250 | 1200 | 1400 | 3500 | 1400 | 1200 | 1800 |
| Extrusion state | ◎ | ◎ | ◎ | ○ | ◎ | ◎ | ◎ | X | ◎ | ○ | X | ◎ | X | X |
| Drawing Temp. (° C.) | 81 | 80 | 80 | 70 | 80 | 80 | 80 | 80 | 80 | 80 | 80 | 80 | 80 | 80 |
| Drawing Time (sec) | 20 | 20 | 20 | 30 | 20 | 20 | 20 | 20 | 20 | 20 | 20 | 20 | 20 | 20 |
| Drawing Ratio | 3 × 4 | 3 × 4 | 3 × 4 | 3 × 4 | 3 × 4 | 3 × 4 | 3 × 4 | 3 × 4 | 3 × 4 | 3 × 4 | 3 × 4 | 3 × 4 | 3 × 4 | 3 × 4 |
| Film Thick. (um) | 20 | 20 | 20 | 21 | 20 | 20 | 20 | 20 | 20 | 20 | 25 | 20 | 20 | 20 |
| Initial Tensile Strength (kgf/mm$^2$) MD | 10 | 15 | 18 | 10 | 12 | 17 | 20 | 2.5 | 15 | 9 | 26 | 7 | 6 | 14 |
| Initial Tensile Strength (kgf/mm$^2$) TD | 13 | 20 | 25 | 14 | 14 | 22 | 26 | 3.1 | 18 | 10 | 30 | 8 | 7 | 17 |
| Sum of Tensile Strength (kgf/mm$^2$) | 23 | 35 | 43 | 24 | 26 | 39 | 46 | 5.6 | 33 | 19 | 56 | 15 | 13 | 31 |
| Elongation Rate (%) MD | 117 | 140 | 120 | 144 | 160 | 137 | 124 | 152 | 145 | 135 | 110 | 212 | 210 | 85 |
| Elongation Rate (%) TD | 70 | 70 | 75 | 78 | 98 | 89 | 86 | 89 | 66 | 98 | 89 | 105 | 98 | 65 |
| F5 (kgf/mm$^2$) MD | 5.3 | 8 | 10 | 5 | 4.8 | 9.4 | 9.8 | 1.5 | 8.7 | 7.9 | 11 | 5 | 6 | 11 |
| F5 (kgf/mm$^2$) TD | 8.1 | 10 | 11 | 7.7 | 7.8 | 12 | 12 | 2.1 | 11 | 9.8 | 12.1 | 6.5 | 6.8 | 13 |
| F100 (kgf/mm$^2$) MD | 8.1 | 15 | 16 | 6.7 | 12 | 17 | 17 | 1.8 | 5.6 | 6.1 | 18.4 | 4.2 | 4.5 | 8.8 |
| Young's Modulus (kgf/mm$^2$) MD | 236 | 230 | 330 | 212 | 180 | 242 | 386 | 179 | 338 | 327 | 350 | 150 | 160 | 302 |
| Young's Modulus (kgf/mm$^2$) TD | 295 | 280 | 418 | 319 | 235 | 300 | 460 | 241 | 419 | 412 | 445 | 165 | 175 | 355 |
| Sum of Young's Modulus (kgf/mm$^2$) | 531 | 510 | 748 | 531 | 415 | 542 | 846 | 420 | 757 | 739 | 795 | 315 | 335 | 657 |
| Wave pattern | ◎ | ◎ | ◎ | ◎ | ◎ | ◎ | ◎ | X | ○ | ○ | X | ◎ | X | X |

TABLE 2-continued

|  | Example | | | | | | Comparative Example | | | | | | | |
| --- | --- | --- | --- | --- | --- | --- | --- | --- | --- | --- | --- | --- | --- | --- |
|  | 1 | 2 | 3 | 4 | 5 | 6 | 1 | 2 | 3 | 4 | 5 | 6 | 7 | 8 |
| Pin hole | ◎ | ◎ | ◎ | ◎ | ◎ | ◎ | ◎ | X | ◎ | ○ | ◎ | X | X | X |
| 100° C. Rate of weight loss (%) | 0.2 | 0.2 | 0.2 | 0.3 | 0.4 | 0.3 | 0.2 | 6 | 5.1 | 5.5 | 0.2 | 7.2 | 3.8 | 4.7 |
| Bleed-out | ◎ | ◎ | ◎ | ◎ | ◎ | ◎ | ◎ | ◎ | X | X | ◎ | ○ | ○ | ○ |
| Haze (%) | 0.2 | 0.2 | 0.2 | 0.3 | 0.3 | 0.2 | 0.7 | 0.7 | 10 | 14 | 0.82 | 2.1 | 1.1 | 1.8 |
| Transmittance (%) | 94 | 94 | 94 | 94 | 93 | 94 | 94 | 87 | 89 | 81 | 93 | 84 | 84 | 85 |
| Anti-blocking | ◎ | ◎ | ◎ | ◎ | ○ | ○ | ◎ | X | ○ | ○ | ◎ | X | X | X |

As shown in the Table 2, the films of Examples 1 to 5 were prepared from the polylactic acid resins of the present invention which comprised the soft segment (polyurethane polyol repeating unit) in an amount of 5 to 20 wt with a weight average molecular weight of 100,000~400,000 and a molecular weight distribution of 1.80~2.15, and Tg of 25 to 55° C. and in Tm of 160 to 178° C. The film of Example 6 was prepared from the polylactic acid resin of the present invention (resin E) and a general polylactic acid resin (resin M).

All of the films of Examples 1 to 6 were found to have an initial tensile strength of 10 kgf/mm² or higher in both machine direction and transverse direction, which indicates excellent mechanical properties. In addition, they exhibited a total Young's modulus in both machine direction and transverse direction of up to 750 kgf/mm², which reflects excellent flexibility. This optimized range of total Young's modulus was helpful in maintaining a suitable level of stiffness. Also, they were found to be superior in various physical properties including transparency, haze, anti-blocking property, and heat resistance as demonstrated by a rate of weight loss of 3 wt % or less after treatment for 1 hr in a 100° C. hot wind oven, a haze of 5% or less, and a light transmittance of 90% or higher. In contrast, the film of Comparative Example 1 which was prepared from general polylactic acid resin M exhibited a total Young's modulus in both machine direction and transverse direction of exceeding 750 kgf/mm², so that the flexibility was too insufficient to use the film as a packaging film. In addition, the extrusion state of the film of Comparative Example 1 made from resins M and L was poor, because the difference of melt viscosity between the two resins was huge. Wave patterns were also found in the final film. Further, as pin holes were generated, the appearance of the film was poor, and the low Tg of resin L caused a problem to the anti-blocking property. The initial tensile strength and the light transmittance were poor as well.

And, the films of Comparative Examples 3 and 4 were formed of materials which were obtained by compounding aliphatic polyester polyols as a plasticizing component, instead of the soft segment polyurethane polyol repeating unit, with resin M in which the aliphatic polyester polyols were prepared by condensing poly(1,3-propanediol) with a number average molecular weight of 2400, or 1,4-butanediol with a number average molecular weight of 11,000 with succinic acid and adiphic acid. In the films of Comparative Examples 3 and 4, degrees of dispersion of the plasticizing components were poor, giving rise to an increase in haze. Furthermore, the plasticizing components were observed to bleed out of the films.

In addition, the film of Comparative Example 5 was formed of resin N which had a high glass transition temperature and a high molecular weight, and did not satisfy the relationship defined by Equation Formula 1 due to a low content of the soft segment. The resin N was unlikely to be processed into films because it had excessively high melt viscosity. In addition, the final film had wave patterns on its surface, and exhibited a total Young's modulus in both machine direction and transverse direction of exceeding 750 kgf/mm², which reflected poor flexibility, thus making it difficult to use the film as a packaging film.

And, the film of Comparative Example 6 was formed of a copolymer that polyester polyol repeating units were introduced and did not satisfy the properties required by the present invention due to a low glass transition temperature. This film exhibited relatively good flexibility as a polyurethane component responsible for flexibility was randomly introduced as small segment units. Nonetheless, it was difficult to be formed to the film because it exhibited a blocking problem as well as poor heat resistance due to low Tg and Tm, as the polylactic acid repeating units were introduced in relatively small sizes as well. In addition, the film was high in haze with low transparency due to low compatibility between polyester polyols and polylactic acids, both responsible for the flexibility. A wide molecular weight distribution appeared due to the ester and/or ester amide exchange reaction during the preparation of the resin incurred non-uniform melt properties, and deterioration in the film extrusion state and mechanical properties.

The films of Comparative Examples 7 and 8 were formed of resins which were prepared by addition polymerizing of polyether polyol with lactide to form a prepolymer and then by subjecting the prepolymer to urethane reaction with diisocyanate or tri- or higher functional compounds. These resins did not satisfy the properties required by the present invention due to a low glass transition temperature. These films were also found to exhibit non-uniform melt viscosity and poor mechanical properties. Because the block characteristics of the hard segment and the soft segment of the resin were deteriorated and the resin had low Tm and Tg, the resin had low heat resistance followed by difficulties in forming into a film due to a blocking problem.

Further, the polylactic acid resin was degraded during the preparation or use of the films of Comparative Examples 6 to 8, because an excess amount of the catalyst was employed in the preparation of the films. Thus, it generated pin holes and a significant weight change at high temperatures, exhibiting poor stability.

What is claimed is:

1. A polylactic acid resin, comprising:
a hard segment comprising a polylactic acid repeating unit of the following Chemical Formula 1; and
a soft segment comprising a polyurethane polyol repeating unit in which structures of the following Chemical Formula 2 are linearly linked to each other via a urethane bond, wherein the urethane bond is bonded directly to each of the structures of Chemical Formula 2,
wherein the polylactic acid resin has a glass transition temperature (Tg) from 22° C. to 55° C.:

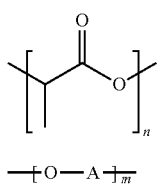

[Chemical Formula 1]

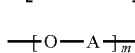

[Chemical Formula 2]

wherein A is a linear or branched alkylene of 2 to 5 carbon atoms, m is an integer of 10 to 100, and n is an integer of 700 to 5000.

2. The polylactic acid resin of claim 1, satisfying a relationship defined by the following Equation 1:

$$75,000 \leq [(WL/144.125)/(WP/MwP)]*144.125 + MwP \leq 220,000$$ [Equation 1]

wherein WL and WP represent weight parts of the hard segment and the soft segment, respectively, based on 100 weight parts of the polylactic acid resin, and Mwp represents a number average molecular weight of the soft segment.

3. The polylactic acid resin of claim 1, having a melt temperature (Tm) of 160 to 178° C.

4. The polylactic acid resin of claim 1,
wherein the urethane bond is formed by a reaction between a terminal hydroxyl group of the structures of Chemical Formula 2 and a diisocyanate compound, and
the structures of Chemical Formula 2 are linearly linked via the urethane bond to form the polyurethane polyol repeating unit.

5. The polylactic acid resin of claim 4, comprising a block copolymer in which the hard segment and the soft segment are copolymerized with each other.

6. The polylactic acid resin of claim 5, wherein the block copolymer has an ester bond forming a linkage between a terminal carboxyl group of the polylactic acid repeating unit and a terminal hydroxyl group of the polyurethane polyol repeating unit.

7. The polylactic acid resin of claim 6, comprising the block copolymer;
and the polylactic acid repeating unit which remains unlinked to the polyurethane polyol repeating unit.

8. The polylactic acid resin of claim 4, wherein the terminal hydroxyl group of the structure of chemical formula 2 and the isocyanate group of the diisocyanate compound are reacted with each other at a molar ratio of 1:0.50 to 1:0.99.

9. The polylactic acid resin of claim 1, having a number average molecular weight of 50,000 to 200,000, and a weight average molecular weight of 100,000 to 400,000.

10. The polylactic acid resin of claim 1, having a molecular weight distribution (Mw/Mn) of 1.60 to 2.20.

11. The polylactic acid resin of claim 1, comprising the hard segment in an amount of 80 to 95 wt % and the soft segment in an amount of 5 to 20 wt %, based on the total weight of the polylactic acid resin.

12. The polylactic acid resin of claim 1, wherein the structure of chemical formula 2 has a number average molecular weight of 400 to 9000.

13. The polylactic acid resin of claim 1, having a melt viscosity of 500 to 3000 Pa·s at a processing temperature of 200 to 250° C.

14. A packaging film comprising the polylactic acid resin according to claim 1.

15. The packaging film of claim 14, having a thickness of 5 to 500 μm.

16. The packaging film of claim 14, having a total machine direction and transversal direction Young's modulus of 350 to 750 kgf/mm2, an initial tensile strength of 10 kgf/mm2 or higher, a rate of weight loss of 0.01 to 3.0 wt % upon treatment for 1 hr in a 100° C. hot wind oven, a haze of 3% or less, and a light transmittance of 85% or higher.

* * * * *